W. R. Morris.
Roller-Skate.

No. 93,110.          Patented Jul. 27, 1869.

Witnesses:
Henry Millward
C. K. Pickles

Inventor:
W. R. Morris
D. P. Holloway & Co.
Special Att'ys

United States Patent Office.

WILLIAM R. MORRIS, OF CINCINNATI, OHIO.

Letters Patent No. 93,110, dated July 27, 1869.

IMPROVEMENT IN ROLLER-SKATES.

The Schedule referred to in these Letters Patent and making part of the same.

*To all whom it may concern:*

Be it known that I, WILLIAM R. MORRIS, of Cincinnati, county of Hamilton, State of Ohio, have invented a certain new and useful Improvement in Roller-Skates; and I hereby declare the following to be a sufficiently full, clear, and exact description thereof, to enable one skilled in the art to which my invention appertains, to make and use it, reference being had to the accompanying drawings making part of this specification.

My invention relates to that class of roller-skates in which the rollers are adjusted for curved lines, by the action of the body of the skater in natural skating movements; and consists in connecting the frame in which the rollers are journalled, to the stock or footboard, by a shackled joint, and providing said frame with inclined planes, which slide over suitable projections on the stock.

My invention further consists, in combination with these devices, in the provision and peculiar arrangement of a piece of rubber under each roller-frame, for the purpose of preventing a rattling noise in the joints, and returning the frames after each movement to the central position.

In the accompanying drawings—

A is the stock or foot-board, provided at each end with the customary strap or straps, B.

Figure 2:
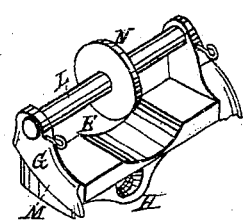
Figure 2 is a perspective view of the roller-frame detached, and section of the joint.
Figures 3, 4:
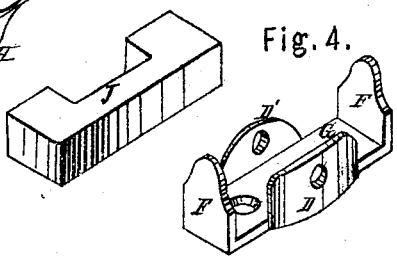
Figure 3 is a view of the rubber spring.
Figure 4 is a view of the plate, which is secured to the stock, and to which the roller-frame is connected.

At each end of the stock A, a plate, C, is firmly secured, which is provided with the jaws D D', for the shackling-hinge joint with the frame E, and is also provided with projections F F', on which the frame G rests, to which the rollers are journalled. The projecting tenon H, which connects with the jaws D D' by means of pin I, does not fill the jaw, and the hole $h$, in the tenon through which the pin I passes, is "countersunk." (See fig. 2.)

The provision of the wide jaws D D', and countersunk hole $h$, permits an oscillating movement of the frame G, in any direction.

Figure 1:
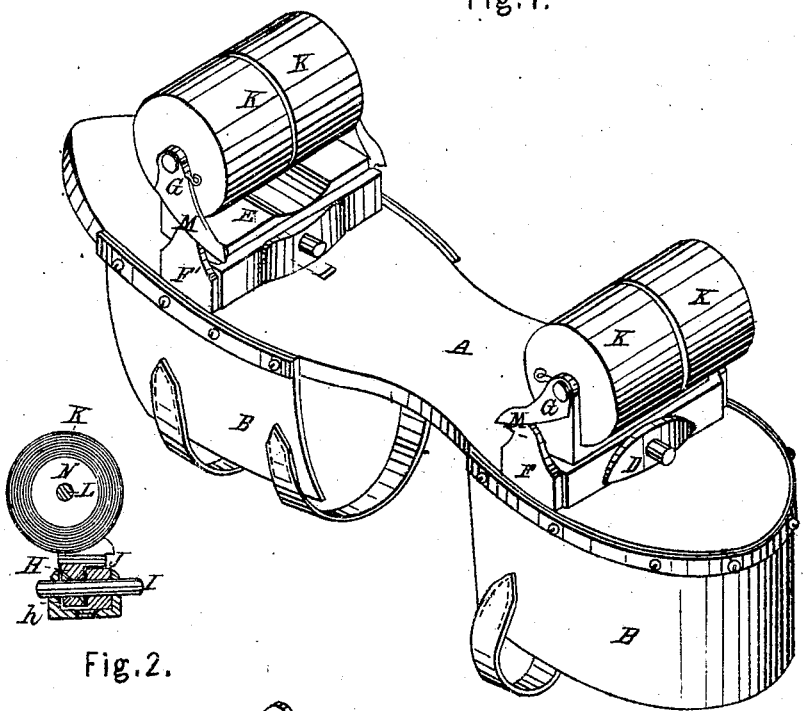
Figure 1 is a perspective view of the under side of a roller-skate, which embodies my invention.

The space between the projections F F', and the space between the jaws D D', minus the thickness of tenon H, is filled up with the rubber spring J, which fits snugly in between the stock-plate C, and the bottom of the frame G. (See fig. 1.)

This serves the purpose of preventing rattling in the joint between the frame G and plate C, and also serves to return the roller-frame to the central position, after its adjustment by the body of the skater in turning curves.

The rollers K, which revolve loosely on the stationary axle L, are adjusted to turn curves, by the depression of one or the other of the projections F F', in the natural leaning of the body of the skater, the projection F or F' acting upon one of the inclined planes M, on the frame G, and thus compelling the frame to swivel, and so converge or adjust the axle of the rollers as to adapt the said rollers for describing the curve desired by the skater.

The rollers K, are loose upon a single axle, L, and are separated by a loose washer N, which is free to revolve with the rollers, when both are going in one direction; and to either stand still or to revolve, as the particular location of friction may determine, when the rollers are revolving in opposite directions. By this device, much friction is obviated in the ordinary movements of fancy skating.

I claim herein as new and of my invention—

The roller-frame G, provided with tenon H, and inclined planes M, in the described combination, with the projections F F' and jaws D D', the whole being constructed and operating substantially in the manner and for the purposes set forth.

In testimony of which invention, I hereunto set my hand.

W. R. MORRIS.

Witnesses:
HENRY MILLWARD,
CHARLES PICKLES.